United States Patent [19]

Mayer

[11] 4,250,215
[45] Feb. 10, 1981

[54] COOKING UTENSIL WITH NON-STICK COOKING SURFACE

[75] Inventor: Morrie M. Mayer, Terre Haute, Ind.

[73] Assignee: General Housewares Corp., Terre Haute, Ind.

[21] Appl. No.: 14,838

[22] Filed: Feb. 26, 1979

[51] Int. Cl.³ ............... B32B 15/18; B32B 17/10; B65D 25/14

[52] U.S. Cl. ............... 428/35; 106/48; 220/458; 428/421; 428/422; 428/427; 428/433; 428/442; 428/450; 428/454

[58] Field of Search ............... 428/421, 432, 422, 450, 428/454, 433, 427, 442, 35; 427/419 A, 419 B, 419 C, 419 D, 419 E, 239; 220/456, 458; 126/373, 390; 106/48

[56] References Cited

U.S. PATENT DOCUMENTS

| | | | |
|---|---|---|---|
| 2,321,656 | 6/1942 | Chester | 106/48 |
| 2,706,692 | 4/1955 | Chester | 106/48 |
| 2,795,506 | 6/1957 | Sweo | 428/432 X |
| 2,930,713 | 3/1960 | Hoffman | 428/450 X |
| 3,008,601 | 11/1961 | Cabne | 220/458 |
| 3,241,545 | 3/1966 | Reinert et al. | 220/457 X |
| 3,419,414 | 12/1968 | Marks | 220/456 X |
| 3,962,523 | 6/1976 | Robinson | 106/48 |

FOREIGN PATENT DOCUMENTS

| | | | |
|---|---|---|---|
| 960350 | 6/1964 | United Kingdom | 106/48 |
| 444741 | 9/1975 | U.S.S.R. | 106/48 |

Primary Examiner—Allan N. Shoap
Attorney, Agent, or Firm—Vogel, Dithmar, Stotland, Stratman & Levy

[57] ABSTRACT

A cooking utensil having a body sheet of iron base metal with a non-stick coating tenaciously secured to the surfaces thereof that are presented toward foods to be cooked, the non-stick coating being of composite construction including an inner layer and intermediate layer and an outer layer, the inner layer consisting essentially of a porcelain enamel ground coat providing protection for the adjacent surface of the body sheet, the intermediate layer consisting essentially of a porcelain enamel cover coat adhered both to the inner layer and the outer layer and providing resistance to wear and abrasion, the outer layer consisting essentially of a non-stick plastic material adhesively bonded to the adjacent surface of the intermediate layer.

6 Claims, 1 Drawing Figure

U.S. Patent        Feb. 10, 1981        4,250,215
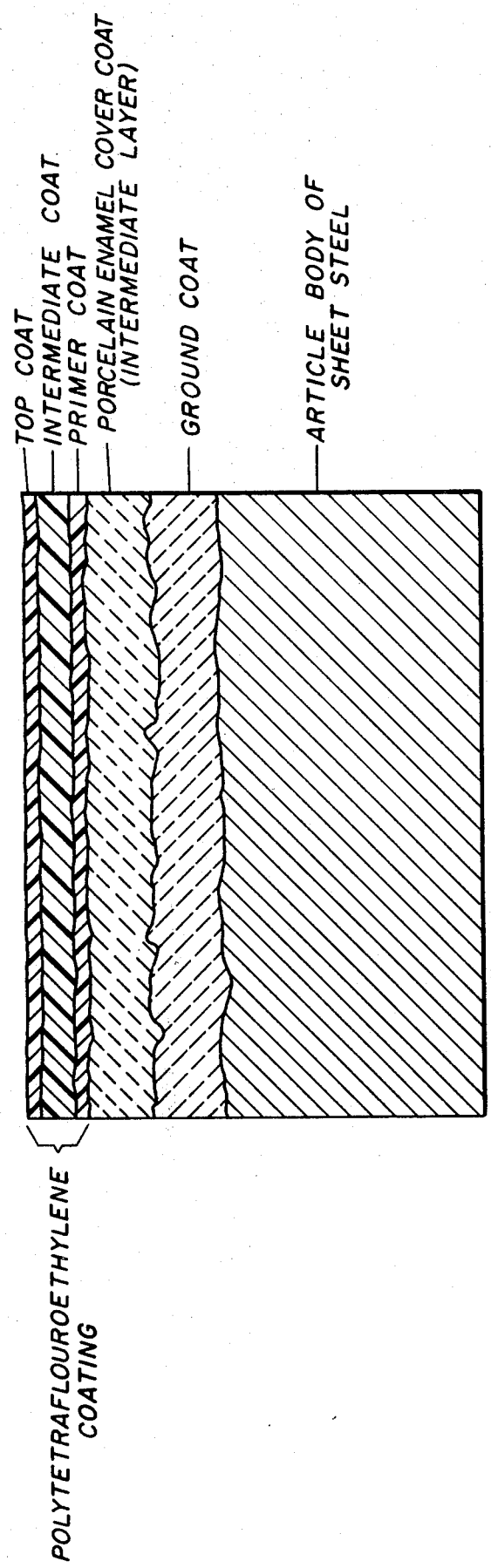

COOKING UTENSIL WITH NON-STICK COOKING SURFACE

PRIOR ART STATEMENT AND BACKGROUND OF THE INVENTION

The present invention relates generally to cooking utensiles having a body sheet of iron base metal with a non-stick coating on at least the food-contacting surfaces thereof, a procelain enamel coating being disposed between the non-stick coating and the body sheet of the cooking utensil to provide protection thereof in the event of a break in the non-stick coating.

There is disclosed in U.S. Pat. No. 3,008,601 granted Nov. 14, 1961 to M. Cahne a cooking utensile having a metallic base or body sheet to which was applied by fusion a polytetrafluoroethylene coating that was non-sticking with respect to foods and the like. Manufacturers of cooking utensils carrying such polytetrafluoroethylene coatings are well aware of the fact that such coatings are readily ruptured in use if metallic utensiles are applied to the coating, particularly if a knife edge or sharp fork tang is applied thereto, and thus recommend the use of wooden or plastic implements and utensils therewith. Further difficulties are sometimes encountered in maintaining adherence of the polytetrafluoroethylene coating to the metal body sheet during normal cooking and cleaning conditions. Any separation or rupture of the polytetrafluoroethylene coating with respect to the underlying steel body sheet exposes the steel body sheet to the corrosive action of acids, bases and other corrosive chemicals in foods, and to water during the cleansing process, which contact causes corrosion and rusting of the underlying steel body sheet. Such rusting of the steel body sheet through the polytetrafluoroethylene layer is both unsightly and unsanitary and was found to be highly undesirable by users of the cooking utensile.

Efforts have been made to overcome this problem of the rupture of the polytetrafluoroethylene coating and the rusting of the steel body sheet thereunder by substituting other materials for the steel body sheet, which other materials are less subject to corrosion and rusting. For example, certain manufacturers have made the body sheet of aluminum, while others have provided an aluminized steel body sheet as is illustrated in U.S. Pat. No. 3,241,545 granted Mar. 22, 1966 to R. L. Reinert and C. T. Fliss. Such constructions are substantially more expensive than body sheets formed of steel and difficulty is sometimes encountered in providing good adherence of the polytetrafluoroethylene coating to the body sheet.

SUMMARY OF THE INVENTION

The present invention provides a cooking utensile having a non-stick plastic coating and including an intermediate porcelain enamel layer between the non-stick coating and an iron base metal body sheet that will protect the body sheet even if the non-stick coating is breached, so as to prevent corrosion and rusting of the body sheet through breaches in the non-stick coating.

This is accomplished in the present invention, and it is an object of the present invention to accomplish these desired results, by providing a cooking utensil comprising a body sheet having a non-stick coating tenaciously secured to the surfaces of the body sheet that are presented toward foods to be cooked, the body sheet being formed of an iron base metal subject to corrosion upon contact with water, the non-stick coating being of composite construction including an inner layer intimately bonded to the adjacent surface of the body sheet and an intermediate layer intimately bonded to the inner layer and an outer layer intimately bonded to the intermediate layer, the inner layer consisting essentially of porcelain enamel for providing corrosion protection for the adjacent surface of the body sheet, the intermediate layer consisting essentially of porcelain enamel adherent both to the inner layer and the outer layer and providing resistance to wear and abrasion, and the outer layer consisting essentially of a non-stick plastic material adhesively bonded to the adjacent surface of the intermediate layer.

Another object of the invention is to provide a cooking utensile of the type set forth wherein the body sheet is formed from a material selected from the group consisting of cold rolled steel and enameling iron.

Yet another object of the invention is to provide a cooking utensil of the type set forth wherein the inner layer is a fired frit ground coat, and has a thickness in the range from about 0.003 inch to about 0.005 inch.

Still another object of the invention is to provide a cooking utensil of the type set forth wherein the outer layer is formed of a fluorocarbon resin, and preferably tetrafluoroethylene resin, and has a thickness in the range from about 0.0011 inch to about 0.0013 inch.

A further object of the invention is to provide a cooking utensil of the type set forth wherein the intermediate layer is a fired porcelain enamel cover coat formed from a mixture that consists essentially of from about 31% by weight of about 60% by weight of ground coat frit and from about 21% by weight to about 50% by weight of titanium white cover coat sheet steel frit and up to about 7% by weight of clay and from about 0.13% by weight to about 0.19% by weight of Bentonite and from about 0.21% by weight to about 0.27% by weight of magnesium carbonate and from about 0.13% by weight to about 0.19% by weight of sodium nitrite and from 11% by weight to about 13% of matting glaze, the sum of the percent by weight of the ground coat frit and the cover coat frit being in the range from about 79% by weight to about 83% by weight.

Further features of the invention pertain to the particular arrangement of the various layers and the composition thereof, whereby the above outlined and additional operating features thereof are attained.

The invention, both as to its oganization and method of operation, together with further features and advantages thereof will best be understood with reference to the following specification and the accompanying drawing.

BRIEF DESCRIPTION OF THE DRAWING

The single drawing is a fragmentary view in cross section through a cooking utensil made in accordance with and embodying the principles of the present invention.

DETAILED DESCRIPTION OF THE PREFERRED EMBODIMENT

In the cooking utensil made in accordance with the present invention, the mechanical strength thereof is imparted thereto by a body sheet which is suitably shaped to provide the general outline of the cooking utensil desired. It is an important feature of the present invention that the body sheet is formed of an iron base metal that is subject to corrosion upon contact with water, unless the iron base metal is protected as will be described more fully hereinafter. Suitable examples of iron base metals useful in the present invention are cold rolled steel and enameling iron, these two examples of iron base metals being the preferred materials of construction. It will be understood that both of these materials are subject to corrosion upon contact with water, or upon contact with acids and bases generally associated with cooking operations, whereby surfaces so exposed will become rusted and otherwise corroded in an undesirable manner.

There is applied to the surfaces of the body sheet that are presented toward foods to be cooked a protective non-stick coating tenaciously secured thereto. The non-stick coating is of composite construction and includes an inner layer of porcelain enamel that provides corrosion protection for the adjacent surface of the body sheet and an outer layer of a non-stick plastic material adhesively bonded to the adjacent procelain enamel layer. The outer surface of the outer layer is non-stick in character so that food may be prepared thereagainst without sticking thereto. The outer layer preferably has a thickness in the range from about 0.0011 inch to about 0.0013 inch and is characterized by a smooth and continuous and crack-free exposed surface that is highly impervious to moisture and substantially completely impervious to greases and to other environmental elements encountered in the cooking operation. This coating of plastic material is subject to no blistering and to no substantial discoloration in use, and may be readily cleaned by washing in water containing a simple detergent. Furthermore, this outer layer of plastic material is completely chemically stable up to temperatures normally encountered in the cooking operation, and specifically up to temperatures as high as 560° F.

Also, it is pointed out that this outer layer of plastic material may incorporate a suitable color pigment imparting a desired color thereto. This improves or enhances the appearance of the cooking utensil and facilitates the carrying out of a color scheme or a decorating plan in the kitchen in which the cooking utensil is used and stored.

The outer layer of plastic material may be any non-stick plastic material such as a fluorocarbon resin, a silicone resin, etc. The preferred plastic material is tetrafluoroethylene resin, and specifically polytetrafluoroethylene resin, that is commercially available and has been used heretofore to provide non-stick surfaces on cooking utensils. There will be described hereinafter a specific preferred polytetraethylene resin and the manner of applying it as the outer layer on a cooking utensil.

An important aspect of the present invention is the interposition of a porcelain enamel layer between the body sheet formed of an iron base metal and the outer layer of non-stick plastic material, the layer of procelain enamel providing corrosion protection for the adjacent surface of the body sheet in the event of the rupture of the outer layer of non-stick plastic material. The porcelain enamel layer also provides resistance to wear and abrasion and thus further protects the body sheet formed of the iron base metal. Because of the wide disparity between the characteristics of the adjacent surface of the body sheet of iron base metal and the outer layer of non-stick plastic materials, it has been found necessary to provide a two-layer porcelain enamel composition, and more specifically an inner layer disposed against the body sheet of iron base metal and an intermediate layer carrying the outer layer of non-stick plastic material, the inner layer of porcelain enamel being tightly adherent to the iron base metal forming the body sheet, while the intermediate layer of porcelain enamel is tightly adherent to and adhesively bonded with the outer layer of non-stick plastic material.

The inner layer of porcelain enamel is hereinafter referred to as a ground coat. The following is the composition of a typical ground coat frit useful in the present invention.

| Ground Coat Frit | |
|---|---|
| Ingredient | % By Weight |
| Feldspar | 27.4 |
| Borax | 27.3 |
| Quartz | 27.3 |
| Soda Ash | 5.3 |
| Sodium Nitrate | 5.3 |
| Fluorspar | 5.3 |
| Cobalt Oxide | 0.7 |
| Manganese Oxide | 0.7 |
| Nickel Oxide | 0.7 |

Other ground coat frits may be used in place of the ground coat frit described above, provided that the resultant ground coat has good adhesion to the underlying body sheet upon the firing of the ground coat thereon. The method of applying the ground coat frit system and the firing thereof will be described hereinafter.

The intermediate layer is a porcelain enamel cover coat that is adherent both to the inner layer of porcelain enamel ground coat and the outer layer of non-stick plastic material. The intermediate layer serves firmly to bond to both the porcelain enamel cover coat of the inner layer and the non-stick plastic material of the outer layer. It also provides resistance to wear and abrasion should the outer layer of non-stick plastic material become cracked or torn away during use. Furthermore, the intermediate layer of porcelain enamel cover coat assists the inner layer of porcelain enamel ground coat in protecting the body sheet of iron base metal from corrosion in case of abrasion or removal of a portion of the non-stick plastic material of the outer layer during use.

The following is the composition of a typical cover coat useful in the present invention to produce the intermediate layer:

| Cover Coat | |
|---|---|
| Ingredient | % By Weight |
| Ground coat frit | 40.60 |
| Titania white cover coat frit | 40.60 |
| Kentucky #5 clay | 3.12 |
| Black label clay | 3.12 |
| Bentonite | 0.16 |
| Magnesium carbonate | 0.24 |
| Sodium nitrite | 0.16 |
| #3851-2 Ferro matting glaze | 12.00 |

The ground coat frit as set forth in the above intermediate layer composition has the same composition as the ground coat frit of the inner layer discussed heretofore. As little as 31% by weight of the ground coat frit may be utilized successfully and up to about 60% by weight of the ground coat frit may be utilized.

The titania white cover coat frit used in the intermediate layer has the following typical composition:

| Titania White Cover Coat Frit | |
|---|---|
| Ingredient | % By Weight |
| Titanium dioxide | 17.0 |
| Borax | 17.0 |
| Quartz | 40.0 |
| Potassium nitrate | 5.0 |
| Potassium carbonate | 6.0 |
| Magnesium carbonate | 2.0 |
| Aluminum oxide | 1.5 |
| Zinc oxide | 1.5 |
| Sodium silicofluoride | 10.0 |

As little as 21% by weight of the titania white cover coat frit may be used and as much as 50% by weight thereof may be used successfully in the intermediate layer. Furthermore, the sum of the percent by weight of the ground coat frit and the titanium white cover coat frit should be in the range from about 79% by weight to about 83% by weight, a typical value being 81% by weight of the total formulation of the intermediate layer on a dry basis. A proper blend of the ground coat and the cover coat is important for correct firing temperature and an ability to withstand additional firing cycles without the structure of the intermediate layer being affected. Ground coat/cover coat proportions below the recommended level will cause structural breakdown of the intermediate layer, while ground coat/cover coat proportions above the recommended level will not allow the structure of the intermediate layer fully to develop.

The Kentucky #5 clay has the following typical chemical analysis:

| Ingredient | % By Weight |
|---|---|
| Silicon dioxide | 58.9 |
| Aluminum oxide | 26.0 |
| Titanium dioxide | 1.9 |
| Iron oxide | 1.1 |
| Calcium oxide | 0.4 |
| Magnesium oxide | 0.3 |
| Potassium oxide | 1.0 |
| Sodium oxide | 0.3 |
| Loss on ignition | 10.1 |

As regards the particle size, 55% is finer than 0.5 micron; the water of plasticity is 35% and the linear dry shrinkage is about 5%.

The black label clay has the following composition:

| Ingredient | % By Weight |
|---|---|
| Silicon dioxide | 53.80 |
| Aluminum oxide | 30.30 |
| Titanium dioxide | 2.08 |
| Iron oxide | 0.86 |
| Zirconium oxide | 0.03 |
| Sodium oxide | 0.10 |
| Potassium oxide | 0.44 |
| Magnesium oxide | 0.10 |
| Calcium oxide | 0.24 |
| Loss on ignition (including water) | balance |

Any fine grained fire clay or blend of fire clays that is suitable for porcelain enameling may be substituted for the Kentucky #5 clay and/or the black label clay. The clay should not contain any appreciable amount of impurities such as micus, organic materials, iron, or course grains.

Kentucky #5 clay can be substituted entirely for the black label clay and vice versa, and the combined content of clay in the intermediate layer may be from about 3% by weight and as high as 7% by weight. The proper blend of the clays is dependent upon local environment requirements and viscosity requirements. A total clay content below that recommended will result in unstable rheology of the prepared enamel slip, while a clay content above that recommended will not improve the rheology of the prepared enamel slip and may inhibit proper coating applications.

The bentonite utilized was an air-floated purified form of Wyoming bentonite consisting of micron sized particles. Bentonite is a hydrous silicate of alumina comprised essentially of the clay mineral montmorillonite which comprised 99% minimum of the content with small portions of feldspar, biotite, selenite, etc.

The bentonite in the intermediate layer may vary in amount from about 0.13% by weight to about 0.19% by weight. The bentonite improves the bisque strength of the dried enamel and improves the drain characterstics of the enamel slip. Amounts of bentonite below the recommended level will cause excessive drain times and reduced bisque strength, while amounts of bentonite above the recommended level will cause thixotrophic behavior and interfere with the proper application of the enamel slip.

The magnesium carbonate in the intermediate layer may be present in amounts from as little as about 0.21% by weight and up to an amount of about 0.27% by weight. Amounts of magnesium carbonate below the recommended level will not sufficiently affect enamel slip rheology for proper control of viscosity of the enamel slip, while amounts of magnesium carbonate above the recommended level will adversely affect enamel slip rheology, causing excessive viscosity and perhaps resulting in precipitation of magnesium crystals in the fired structure of the intermediate layer.

The sodium nitrite may be present in the intermediate layer in an amount as low as 0.13% by weight up to as much as about 0.19% by weight. In amounts below the recommended level, the rheology of the enamel slip will not have the proper controlled viscosity, while at amounts of sodium nitrite above the recommended level, the rheology of the enamel slip is adversely affected, causing excessive viscosity and can result in precipitation of sodium crystals in the fired structure of the intermediate layer.

Other chemicals can be substituted for the magnesium carbonate and the sodium nitrite, provided that the blender of the enamel slip pays proper attention to the requirements thereof. Examples of compounds that can be substituted are barium carbonate, barium chloride, barium nitrate, magnesium sulfate, potassium carbonate, potassium chloride, potassium nitrate, sodium aluminate and calcium carbonate.

The #3851-2 matting glaze has a theoretical formula of 48.9% silicon dioxide, 26.8% aluminium oxide, 23.8% magnesium oxide and 0.5% calcium oxide.

The #3851-2 matting glaze may be present in the intermediate layer in an amount as small as about 11% by weight and up to an amount as great as 13% by weight. At amounts below the recommended level, there will result improper fired surface roughness in the intermediate layer, and the intermediate layer also will not maintain its degree of roughness through subsequent firing operations, thus reducing the adherence of the non-stick plastic material thereto. At amounts above the recommended level, the fired surface roughness of the resultant intermediate layer will not be improved and the structural development of the fired coating may be inhibited.

In the manufacture of a cooking utensil made in accordance with the present invention, a body sheet is first formed of an iron based metal such as cold rolled steel or enameling iron suitable for porcelain enameling operations. For the purposes of the following description, it will be assumed that a cold rolled steel body sheet is provided, the body sheet being shaped in the form of the finished utensil by the usual forming operations. The steel body sheet is then cleaned in accordance with standard procedures in the porcelain enameling industry. That is, the steel body sheet is degreased, rinsed, acid etched, rinsed, a nickel flash applied, followed by rinsing and then neutralization.

A slip is then formed by placing the ingredients of the ground coat frit in water and suspending the solids therein. A ground coat is applied to the chemically cleaned steel body sheet either by spraying or dipping methods, a coating of ground coat slip being applied so that the resultant fired ground coat has a thickness in the range from about 0.003 inch to about 0.005 inch. The ground coat slip coated steel body sheet is dried at a temperature of 375° F.±25° F. for three to five minutes. The steel body sheet with the dried ground coat frit thereon is then fired at a rate not to exceed 500° F. per minute temperature rise, with a soak temperature of 1520° F.±10° F. for 1.5 minutes ±0.5 minutes. Thereafter, the steel body sheet with the fired ground coat thereon is cooled to ambient temperature.

The intermediate layer is next applied. There is prepared an enamel slip for the intermediate layer by mixing the ingredients thereof set forth above in the table entitled "Cover Coat", and more specifically, 63 parts by weight of the dry ingredients are mixed with 37 parts by weight water, the amount of water in the slip being variable from about 34% by weight to about 40% by weight thereof. If the water content falls below the recommended level, the porcelain enamel cover coat slip will be difficult to handle and difficult to apply resulting in an underdeveloped fired coating structure. If more water is used than that recommended, the resultant cover coat enamel slip will have increased drain time and result in structural breakdown of the fired intermediate layer.

The resultant cover coat enamel slip should have a fineness such that a 50 cc. sample thereof will leave only from about 3 to about 5 grams of solid material on a 200 mesh screen. The specific gravity should be in the range from about 1.65 to about 1.67. The wet coating of the cover coat enamel slip can either be sprayed onto the inner layer of porcelain enamel or the inner layer of porcelain enamel can be dipped in the cover coat enamel slip. The resultant coating of cover coat enamel slip should have a thickness so as to give a resultant fired thickness thereof of from about 0.003 inch to about 0.005 inch.

The applied coating of cover coat enamel slip is dried at a temperature of 375° F.±25° F. for a period of 3 to 5 minutes. The dried layer is then fired using a temperature rise not exceeding 500° F. per minute, with a soak temperature of 1520° F.±10° F. for 1.5 minutes ±0.5 minutes. The fired cover coat is then allowed to cool to ambient temperature.

The fired thickness of the porcelain enamel cover coat of the intermediate layer is in the range from about 0.003 inch to about 0.005 inch, and should be uniformly applied to the ground coated steel body sheet. The fired surface should have a roughness essentially equivalent to and not to exceed the roughness of 80 grit sandpaper. The intermediate layer of porcelain enamel cover coat must be able to pass the Federal Drug Administration (FDA) testing of ceramic coatings for leachability of lead and cadmium, and shall pass all other testing required by FDA guidelines As has been explained, the combination of the inner layer of porcelain enamel ground coat and the intermediate layer of porcelain enamel cover coat must cooperate to protect the steel body sheet from any rusting that may develop under adverse conditions such as a break in the outer layer of non-stick plastic material.

After the intermediate layer of porcelain enamel has been applied, the outer layer of non-stick plastic material is applied thereto, the preferred outer layer being a polytetrafluoroethylene resin. The polytetrafluoroethylene resin system utilized is a three-coat system comprising a primer coat, an intermediate coat and a top coat.

The primer coat is a material provided commercially by ICI Americas, that company's primer #604 which is an acid accelerator primer. The primer is applied by dipping or spraying, and afterwards the primer coat is baked at a temperature of 500° F.±10° F. for 4 to 5 minutes.

An intermediate polytetrafluoroethylene coat is then applied over the baked primer coat, a suitable material for the intermediate coat being provided by ICI Americas under the trade designation "Fluon 3C43". The top coat of polytetrafluoroethylene is also formed of the same material as the intermediate coat, and the intermediate coat and the top coat are applied as a wet-on-wet process. The resultant thickness of the three coats should be such that the cured thickness is from about 0.0011 inch to about 0.0013 inch. The intermediate coat and the top coat are cured at a temperature of 790° F.±10° F. for a period of 4.5 minutes ±0.5 minute. The resultant polytetrafluoroethylene outer layer meets the requirements established by the FDA for such coatings on cooking utensils.

It will be seen that in the resultant cooking utensil, both the porcelain enamel inner layer and the intermediate layer, as well as the non-stick plastic material outer layer meet the requirements of the FDA for cooking utensils. The adherence of the polytetrafluoroethylene coating to the porcelain enamel intermediate layer is excellent and will withstand the usual normal use, and will ordinarily be unbroken during the life of the cooking utensil unless some sharp instrument such as a knife or the pointed tine of a fork is gouged into the polytetrafluoroethylene layer. Should the user break the polytetrafluoroethylene outer layer, thus exposing the porcelain enamel of the intermediate layer or even the inner layer, the steel body sheet will be protected and there will be no formation of rust or other corrosion that will penetrate the inner layer and intermediate layer of porcelain enamel. The porcelain enamel intermediate layer also offers resistance to wear and abrasion in normal cooking environments that will result a longer useful life of the polytetrafluorethylene coated cooking utensil.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. A cooking utensil having a non-stick coating on at least the food-contacting surfaces thereof, said cooking utensil comprising; a body sheet formed of a material selected from the group consisting of cold rolled steel and enameling iron, said body sheet having a non-stick coating tenaciously secured to the surfaces thereof that are presented toward foods to be cooked, said non-stick coating being of composite construction including an inner layer intimately bonded to the adjacent surface of said body sheet, an intermediate layer intimately bonded to said inner layer and an outer layer intimately bonded to said intermediate layer, said inner layer consisting essentially of porcelain enamel formed of a ground coat frit fired on the adjacent surface of said body sheet, said outer layer consisting essentially of a non-stick plastic material, said ground coat frit consisting essentially of about 82% by weight of a mixture of feldspar and borax and quartz and of about 16% by weight of a mixture of soda ash and sodium nitrate and fluorspar and of about 2% by weight of a mixture of cobalt oxide and manganese oxide and nickel oxide, said intermediate layer consisting essentially of from about 31% by weight to about 60% by weight of said ground coat frit and from about 21% by weight to about 50% by weight of titanium white cover coat frit and from about 3% up to 7% by weight of clay and from about 0.13% by weight to about 0.19% by weight of bentonite and from about 0.21% by weight to about 0.27% by weight of magnesium carbonate and from about 0.13% by weight to about 0.19% by weight of sodium nitrite and from about 11% by weight to about 13% by weight of matting glaze, the sum of the percent by weight of said ground coat frit and said titanium white cover coat frit being in the range from about 79% by weight to about 83% by weight.

2. The cooking utensil set forth in claim 1 wherein said inner layer has a thickness in the range from about 0.003 inch to about 0.005 inch.

3. The cooking utensil set forth in claim 1 wherein said intermediate layer has a thickness in the range from about 0.003 inch to about 0.005 inch.

4. The cooking utensil set forth in claim 1 wherein said outer layer is formed of a fluorocarbon resin.

5. The cooking utensil set forth in claim 1 wherein said outer layer is formed of tetrafluoroethylene resin.

6. The cooking utensil set forth in claim 1 wherein said outer layer has a thickness in the range from about 0.0011 inch to about 0.0013 inch.

* * * * *